(12) United States Patent
Jacobson (10) Patent No.: US 9,038,383 B2
(45) Date of Patent: May 26, 2015

(54) FLYWHEEL ASSEMBLY FOR A TURBOCHARGER

(75) Inventor: Evan Earl Jacobson, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 13/556,787

(22) Filed: Jul. 24, 2012

(65) Prior Publication Data
US 2014/0026564 A1    Jan. 30, 2014

(51) Int. Cl.
*F02B 33/44* (2006.01)
*F02B 37/10* (2006.01)
*F02B 37/14* (2006.01)
*F02B 39/12* (2006.01)

(52) U.S. Cl.
CPC ............... *F02B 37/10* (2013.01); *F02B 37/14* (2013.01); *F02B 39/12* (2013.01); *Y02T 10/144* (2013.01)

(58) Field of Classification Search
CPC .......... F02B 3/06; F02B 37/10; F02B 37/105; F02B 37/14; F02B 39/02; F02B 39/04; F02B 39/06; F02B 39/12; F02D 41/0007; Y02T 10/144; F16H 61/0293
USPC .............................. 60/606, 607–609; 475/315
See application file for complete search history.

(56) References Cited

U.S. PATENT DOCUMENTS

| | | | | |
|---|---|---|---|---|
| 4,312,183 A | * | 1/1982 | Regar | 60/608 |
| 4,583,505 A | * | 4/1986 | Frank et al. | 123/198 F |
| 5,368,004 A | * | 11/1994 | Mann | 123/559.1 |
| 6,553,764 B1 | * | 4/2003 | Gladden et al. | 60/608 |
| 7,540,346 B2 | * | 6/2009 | Hu | 180/165 |
| 2004/0025506 A1 | * | 2/2004 | Shaffer | 60/608 |
| 2007/0044470 A1 | | 3/2007 | Sumser et al. | |
| 2007/0101714 A1 | * | 5/2007 | Duesmann et al. | 60/598 |
| 2010/0135767 A1 | | 6/2010 | Arduini | |
| 2011/0302919 A1 | | 12/2011 | Schlemmer-Kelling | |

FOREIGN PATENT DOCUMENTS

| | | | | |
|---|---|---|---|---|
| DE | 2834785 A1 | | 2/1980 | |
| DE | 19924918 | | 12/2000 | |
| DE | 10321387 | | 12/2004 | |
| JP | 57143127 A | * | 9/1982 | F02B 37/00 |
| JP | S585426 | | 1/1983 | |
| JP | 59005832 A | * | 1/1984 | F02B 37/10 |
| WO | WO 8800283 A1 | * | 1/1988 | F02B 37/10 |
| WO | 2005119027 | | 12/2005 | |
| WO | WO 2009/148918 a2 | * | 12/2009 | F02B 39/10 |

OTHER PUBLICATIONS

Translation of abstract for JP 59005832 A, May 7, 2014.*

* cited by examiner

*Primary Examiner* — Thai Ba Trieu
*Assistant Examiner* — Jason T Newton
(74) *Attorney, Agent, or Firm* — Miller, Matthias & Hull LLP (57) ABSTRACT

A flywheel assembly for a turbocharger a rotatable flywheel shaft that is separate from a turbocharger shaft, and a flywheel body coupled to the flywheel shaft. A flywheel sensor determines a flywheel operating parameter and supplies a flywheel feedback signal indicative of the flywheel operating parameter, and a flywheel clutch selectively couples the flywheel shaft to the turbocharger shaft. A controller operates the flywheel clutch based on the flywheel feedback signal. The flywheel shaft and flywheel body may be disposed in a flywheel housing that is separate and spaced from a turbocharger housing.

20 Claims, 3 Drawing Sheets

FLYWHEEL ASSEMBLY FOR A TURBOCHARGER

TECHNICAL FIELD

The present disclosure generally relates to mechanical energy storage devices, and more particularly to flywheel assemblies for turbochargers provided on internal combustion engines.

BACKGROUND

A limiting factor in the performance of an internal combustion engine is the amount of combustion air that can be delivered to the intake manifold for combustion in the engine cylinders. Atmospheric pressure is often inadequate to supply the required amount of air for proper operation of the engine. An internal combustion engine, therefore, may include one or more turbochargers for compressing air to be supplied to the combustion chambers provided within corresponding combustion cylinders. The turbocharger supplies combustion air at a higher pressure and density than existing atmospheric pressure and ambient density. The use of a turbocharger can compensate for lack of power due, for example, to altitude, or to otherwise increase power that can be obtained from an engine of a given displacement, thereby reducing cost, weight, and size of the engine required for a given output.

A turbocharger typically includes a turbine driven by exhaust gases from the engine, and a compressor driven by the turbine. The compressor receives from atmosphere the air to be compressed and supplies the air to the combustion chamber. A common shaft interconnects the turbine wheel of the turbine with the compressor wheel in the compressor section. A stream of exhaust gases from the engine is conducted from the exhaust manifold to the turbine. The stream of exhaust gases passing through the turbine causes the turbine wheel to rotate, thereby turning the common shaft and rotating the compressor wheel.

Several problems are experienced with previously known constructions for turbochargers. For instance, turbochargers generally take some time to gain speed and provide increased pressure when increased power demands are placed on the system. This generally is the result of rotational inertia of the turbocharger. Therefore, when the engine is operating under conditions that require quick increases in power, a delay period occurs while the turbocharger accelerates and desired instantaneous increases in power cannot be achieved. This also holds true when the engine is operating under conditions that require quick decreases in power and pressure. The addition and removal of large electrical loads, or "block loads", incurred while providing a constant rotational speed for the engine are examples of transient loads that may also require quick changes in power and therefore corresponding changes in turbocharger operating speed.

As the engine runs, the turbocharger will cycle through various ranges of rotational speed as power is added or removed. Because of the rotational inertia of the turbocharger, it is often necessary to run the engine at low efficiency to control heating of the exhaust flow during periods of transient loads, thereby controlling rotational speeds of the turbocharger. These low efficiency operations have the drawback of increasing emissions of, for example, soot and nitrogen dioxides.

One solution for improving response of the turbocharger is described in U.S. Patent Application Publication No. 2004/005506 to Shaffer, entitled "Inertia Augmented Turbocharger." The Shaffer document describes a turbocharger having at least one flywheel configured for releasable coupling to the shaft of the turbocharger. More specifically, a first flywheel of Shaffer is positioned between the turbine and the compressor and may directly engage, via a first clutch, the turbocharger shaft. The first flywheel is used primarily to add energy to the turbocharger shaft, and is maintained at an operating rotational speed by selectively directing an air flow over vanes formed around the first flywheel. A second flywheel is also positioned between the turbine and the compressor and may directly engage, via a second clutch, the turbocharger shaft. The second flywheel is used primarily to remove energy from the turbocharger shaft, and therefore is normally stationary until needed. A controller operates the first clutch to permit the first flywheel to add power to the turbocharger shaft and the second clutch to permit the second flywheel to remove power from the turbocharger shaft.

While the arrangement disclosed in Shaffer improves response time of the turbocharger, it also has some drawbacks. By placing the flywheels in a high temperature location between the compressor and the turbine, the capacity of the flywheels is limited. That is, the elevated temperatures within the turbocharger housing restrict the use of certain flywheel materials, such as carbon fiber, that have a higher strength-to-weight ratio and can rotate at higher speeds (such as, for example, approximately 60,000 rpm or more), and therefore have a greater capacity to store and release energy, but are otherwise more sensitive to elevated temperatures. Slight increases in operating temperature may quickly lead to potentially catastrophic damage of the flywheel, as carbon fiber material may delaminate and disintegrate when operating temperatures exceed approximately 170° C. The increased temperature may also increase the pressure surrounding the flywheel, which may degrade flywheel performance by increasing friction forces acting on the flywheel. The Shaffer flywheel arrangement also fails to make productive use of energy removed from the turbocharger shaft.

SUMMARY OF THE DISCLOSURE

In accordance with one aspect of the disclosure, a flywheel assembly is provided for a turbocharger having a turbocharger housing, a turbine disposed in the turbocharger housing, a compressor disposed in the turbocharger housing, and a turbocharger shaft interconnecting the turbine and the compressor in a rotationally fixed manner. The flywheel assembly includes a flywheel housing, a flywheel shaft rotatably supported by the flywheel housing and separate from the turbocharger shaft, and a flywheel body coupled to the flywheel shaft and disposed in the flywheel housing. A flywheel sensor is configured to determine a flywheel operating parameter and supply a flywheel feedback signal indicative of the flywheel operating parameter, and a flywheel clutch is configured to selectively couple the flywheel shaft to the turbocharger shaft. A controller is operably coupled to the flywheel clutch and the flywheel sensor and configured to operate the flywheel clutch based on the flywheel feedback signal.

In another aspect of the disclosure that may be combined with any of these aspects, a machine includes an internal combustion engine having a plurality of cylinders, each cylinder having at least one inlet opening and at least one exhaust gas opening, an intake manifold fluidly communicating with each inlet opening, and an exhaust manifold fluidly communicating with each exhaust gas opening. A turbocharger includes a turbocharger housing, a turbine disposed in the turbocharger housing and having a turbine inlet fluidly communicating with the exhaust manifold and a turbine outlet fluidly communicating with atmosphere, and a compressor disposed in the turbocharger housing having a compressor inlet fluidly communicating to atmosphere and a compressor outlet fluidly communicating with the intake manifold. A turbocharger shaft interconnects the turbine and the compressor in a rotationally fixed manner, and a turbocharger sensor is configured to determine a turbocharger operating parameter and supply a turbocharger feedback signal indicative of the turbocharger operating parameter. A flywheel assembly includes a flywheel housing, a flywheel shaft rotatably supported by the flywheel housing and separate from the turbocharger shaft, and a flywheel body coupled to the flywheel shaft and disposed in the flywheel housing. A flywheel sensor is configured to determine a flywheel operating parameter and supply a flywheel feedback signal indicative of the flywheel operating parameter, and a flywheel clutch is configured to selectively couple the flywheel shaft to the turbocharger shaft. A controller is operably coupled to the flywheel clutch, the flywheel sensor, and the turbocharger sensor, and is configured to operate the flywheel clutch based on the flywheel feedback signal and the turbocharger feedback signal.

In another aspect of the disclosure that may be combined with any of these aspects, a method of operating a turbocharger includes directing exhaust flow from an engine through a turbine, thereby to rotate the turbine, and mechanically coupling a compressor to the turbine so that the compressor rotates with the turbine and forms the turbocharger, the compressor being disposed in an air intake and configured to receive air from atmosphere and provide compressed air to the engine. The method further includes providing a rotatable flywheel, determining an actual turbocharger speed, determining an actual flywheel speed, and selectively mechanically coupling the flywheel to the turbocharger based on the actual turbocharger speed and the actual flywheel speed.

In another aspect of the disclosure that may be combined with any of these aspects, the flywheel sensor includes a flywheel speed sensor and the flywheel operating parameter comprises a flywheel speed.

In another aspect of the disclosure that may be combined with any of these aspects, the turbocharger further includes a turbocharger sensor configured to determine a turbocharger operating parameter and supply a turbocharger feedback signal indicative of the turbocharger operating parameter, and the controller is operably coupled to the turbocharger sensor and further configured to operate the flywheel clutch based on the turbocharger feedback signal.

In another aspect of the disclosure that may be combined with any of these aspects, the flywheel sensor comprises a flywheel speed sensor and the flywheel feedback signal comprises a flywheel speed signal indicative of a flywheel speed, the turbocharger sensor comprises a turbocharger speed sensor and the turbocharger feedback signal comprises a turbocharger speed signal indicative of a turbocharger speed, and the controller is configured to operate the flywheel clutch based on the flywheel speed signal and the turbocharger speed signal.

In another aspect of the disclosure that may be combined with any of these aspects, the controller is configured to determine a threshold turbocharger speed, determine a threshold flywheel speed, and command the flywheel clutch to an engaged position when the turbocharger speed signal indicates a turbocharger speed greater than the threshold turbocharger speed and the flywheel speed signal indicates a flywheel speed less than the threshold flywheel speed.

In another aspect of the disclosure that may be combined with any of these aspects, the controller is configured to determine a threshold turbocharger speed, determine a threshold flywheel speed, and command the flywheel clutch to an engaged position when the turbocharger speed signal indicates a turbocharger speed less than the threshold turbocharger speed and the flywheel speed signal indicates a flywheel speed greater than the threshold flywheel speed.

In another aspect of the disclosure that may be combined with any of these aspects, a gearbox is operably coupled between the flywheel clutch and the flywheel shaft.

In another aspect of the disclosure that may be combined with any of these aspects, an electric motor/generator is operably coupled to the flywheel shaft.

In another aspect of the disclosure that may be combined with any of these aspects, a motor/generator clutch is operably coupled between the electric motor/generator and the flywheel shaft.

In another aspect of the disclosure that may be combined with any of these aspects, the flywheel housing is separate and spaced from the turbocharger housing.

In another aspect of the disclosure that may be combined with any of these aspects, a method may further include determining a threshold turbocharger speed and determining a threshold flywheel speed, and the flywheel is selectively mechanically coupled to the turbocharger when the actual turbocharger speed is greater than the threshold turbocharger speed and the actual flywheel speed is less than the threshold flywheel speed.

In another aspect of the disclosure that may be combined with any of these aspects, a method may further include determining a threshold turbocharger speed and determining a threshold flywheel speed, and in which the flywheel is selectively mechanically coupled to the turbocharger when the actual turbocharger speed is less than the threshold turbocharger speed and the actual flywheel speed is greater than the threshold flywheel speed.

DETAILED DESCRIPTION

Embodiments of a flywheel assembly for a turbocharger are disclosed for use with a combustion engine provided on a machine. The flywheel assembly may include a flywheel shaft rotatably supported in a flywheel housing. A flywheel body may be coupled to and rotate with the flywheel shaft. The flywheel shaft may be separate from a turbocharger shaft, and a flywheel clutch is configured to selectively engage the flywheel shaft to the turbocharger shaft. As a result, energy may be transferred both from the flywheel shaft to the turbocharger shaft, thereby to quickly accelerate the rotational speed of the turbocharger, and from the turbocharger shaft to the flywheel shaft, thereby to quickly decelerate the rotational speed of the turbocharger, as needed. An optional electric motor/generator may be selectively coupled to the flywheel shaft to power auxiliary systems provided on the machine and/or to assist with initial "spin up" of the flywheel body during start-up of the machine. Additionally, the flywheel housing may be separate from the turbocharger housing so that the flywheel assembly is spaced from the elevated heat environment of the turbocharger, thereby improving flywheel performance and expanding the type of flywheel materials that may be used for the flywheel body. In some embodiments, providing a separate flywheel shaft and housing allows the flywheel assembly to be used without modifying the turbocharger assembly, thereby facilitating use in retrofit applications.

Figure 1:
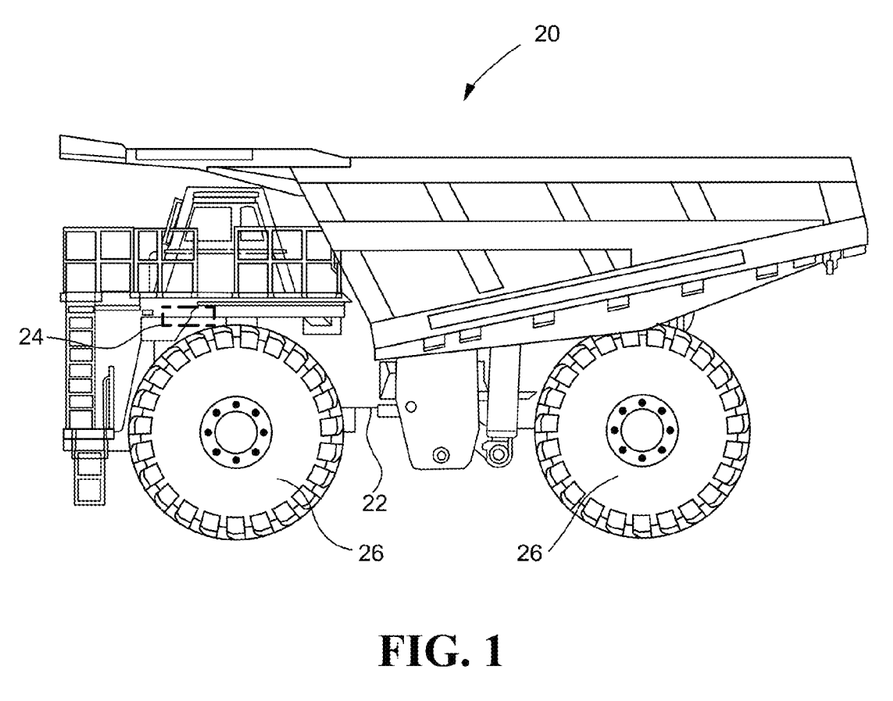
FIG. 1 is a side elevation view of a machine having a flywheel assembly for a turbocharger according to the present disclosure.

FIG. 1 illustrates an exemplary machine 20. The machine 20 may be a mining truck, as shown, or any other type of machine, including on-highway machines, off-highway machines, earth moving equipment, generators, aerospace machines, locomotive machines, marine machines, pumps, stationary equipment, or other engine powered applications. The machine 20 may include a chassis 22 and an internal combustion engine 24 mounted on the chassis. The engine 24 may be any type of engine (internal combustion, gas, diesel, gaseous fuel, natural gas, propane, etc.), may be of any size, with any number of cylinders, and in any configuration ("V," in-line, radial, etc.). In the illustrated embodiment, the engine 24 generates power that may be delivered to ground engaging members 26. The ground engaging members 26 may be tires, as shown, tracks, or the like that may be suitable for a particular application.

Figure 2:
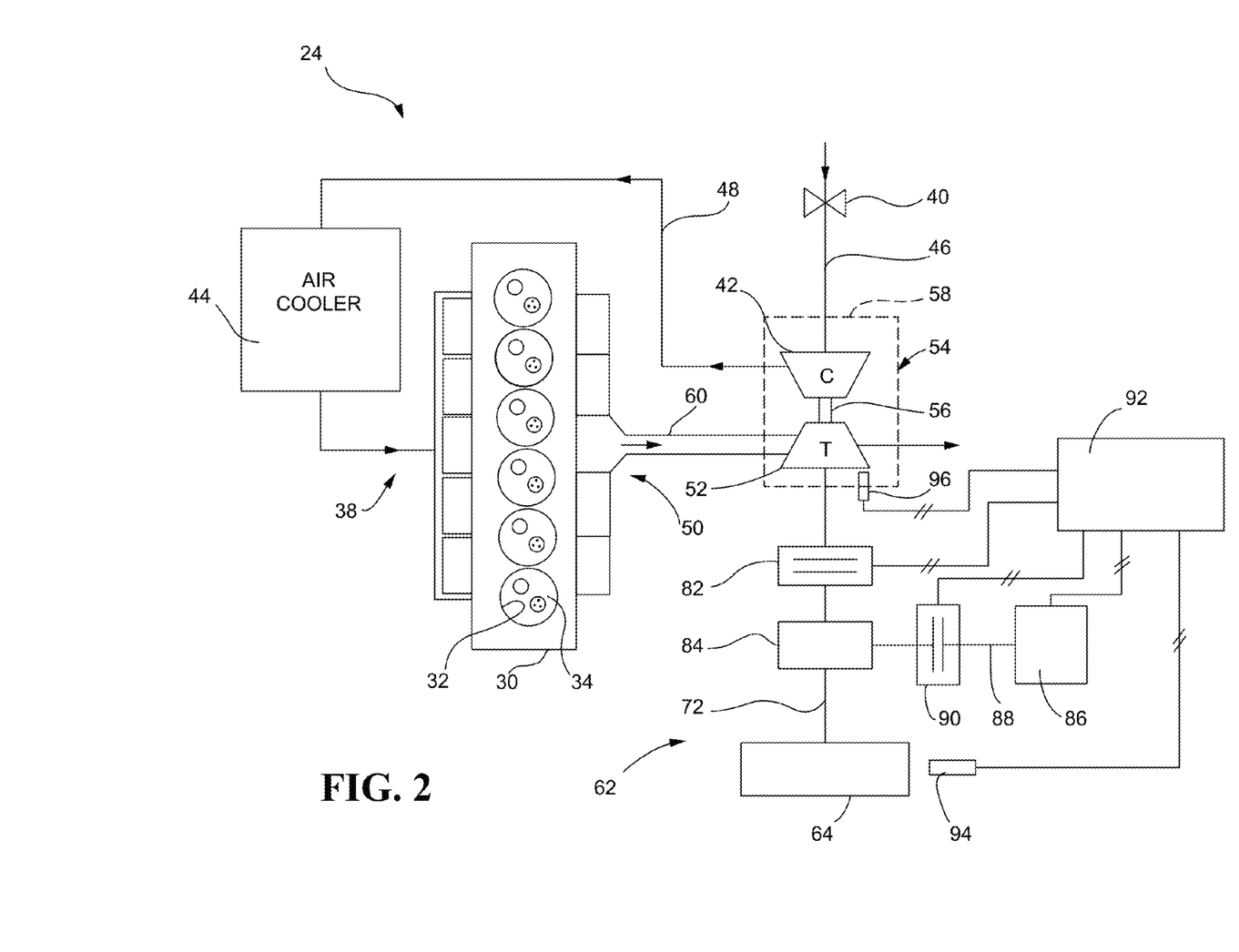
FIG. 2 is a schematic illustration of an exemplary embodiment of a flywheel assembly for a turbocharger in conjunction with an internal combustion engine.

The engine 24 is illustrated in greater detail in FIG. 2. In the exemplary embodiment, the engine 24 includes an engine block 30 that at least partially defines a plurality of cylinders 32. A piston (not shown) may be slidably disposed within each cylinder 32 to reciprocate between a top-dead-center position and a bottom-dead-center position, and a cylinder head (not shown) may be associated with each cylinder 32. The cylinder 32, piston, and cylinder head may form a combustion chamber 34. In the illustrated embodiment, the engine 24 has six combustion chambers 34, however a different number of combustion chambers 34 may be used. The combustion chambers 34 may be disposed in an "in-line" configuration, a "V" configuration, or any other suitable configuration.

An air induction system 38 is provided to introduce air into the combustion chambers 34. The air induction system 38 may include an induction valve 40, one or more compressors 42, and an air cooler 44. Additional components may be included within the air induction system 38 such as, for example, additional valving, one or more air cleaners, one or more waste gates, a control system, a bypass circuit, and other means for introducing charged air into the engine 24. Alternatively, the induction valve 40 and air cooler 44 may be omitted, if desired.

The induction valve 40 may be fluidly coupled to the compressors 42 by a passageway 46 to regulate the flow of atmospheric air into the engine 24. The induction valve 40 may embody, for example, a butterfly valve, a ball valve, a gate valve, or any other type of valve known in the art. The induction valve 40 may be solenoid-actuated, hydraulically-actuated, pneumatically actuated, or actuated in any other manner in response to one or more predetermined conditions.

The compressor 42 may compress the air flowing into the engine 24 to a predetermined pressure level. If more than one compressor 42 is provided in the air induction system 38, the compressors 42 may be disposed in series or in parallel relationship and fluidly coupled to the engine 24 by a passageway 48. The compressor 42 may embody a fixed geometry compressor, a variable geometry compressor, or any other type of compressor known in the art. A portion of the compressed air from the compressor 42 may be diverted from the passageway 48 for other uses, if desired.

The air cooler 44 may embody an air-to-air heat exchanger, an air-to-liquid heat exchanger, or a combination of both, and be configured to facilitate the transfer of thermal energy to or from the compressed air directed into the engine 24. For example, the air cooler 44 may include a shell-and-tube type heat exchanger, a corrugated plate type heat exchanger, a tube-and-fin type heat exchanger, or any other type of heat exchanger known in the art. The air cooler 44 may be disposed in the passageway 48 between the compressor 42 and the engine 24.

An exhaust system 50 may be provided for directing exhaust flow out of the engine 24. In an exemplary embodiment, the exhaust system 50 includes one or more turbines 52 connected in series or parallel relationship. The exhaust system 50 may include additional components such as, for example, particulate traps, NOx absorbers or other catalytic devices, attenuation devices, and other means known in the art for directing exhaust flow out of the engine 24.

The turbine 52 and compressor 42 may be mechanically coupled to form a turbocharger 54. In the illustrated embodiment, a turbocharger shaft 56 interconnects the compressor 42 and the turbine 52, and the compressor 42, turbine 52, and turbocharger shaft 56 are disposed in a turbocharger housing 58. Hot exhaust gases exiting the engine 24 move through an exhaust passage 60 to the turbine 52, where the gases expand against turbine blades (not shown), thereby to rotate the turbine 52 and interconnected compressor 42.

Figure 3:
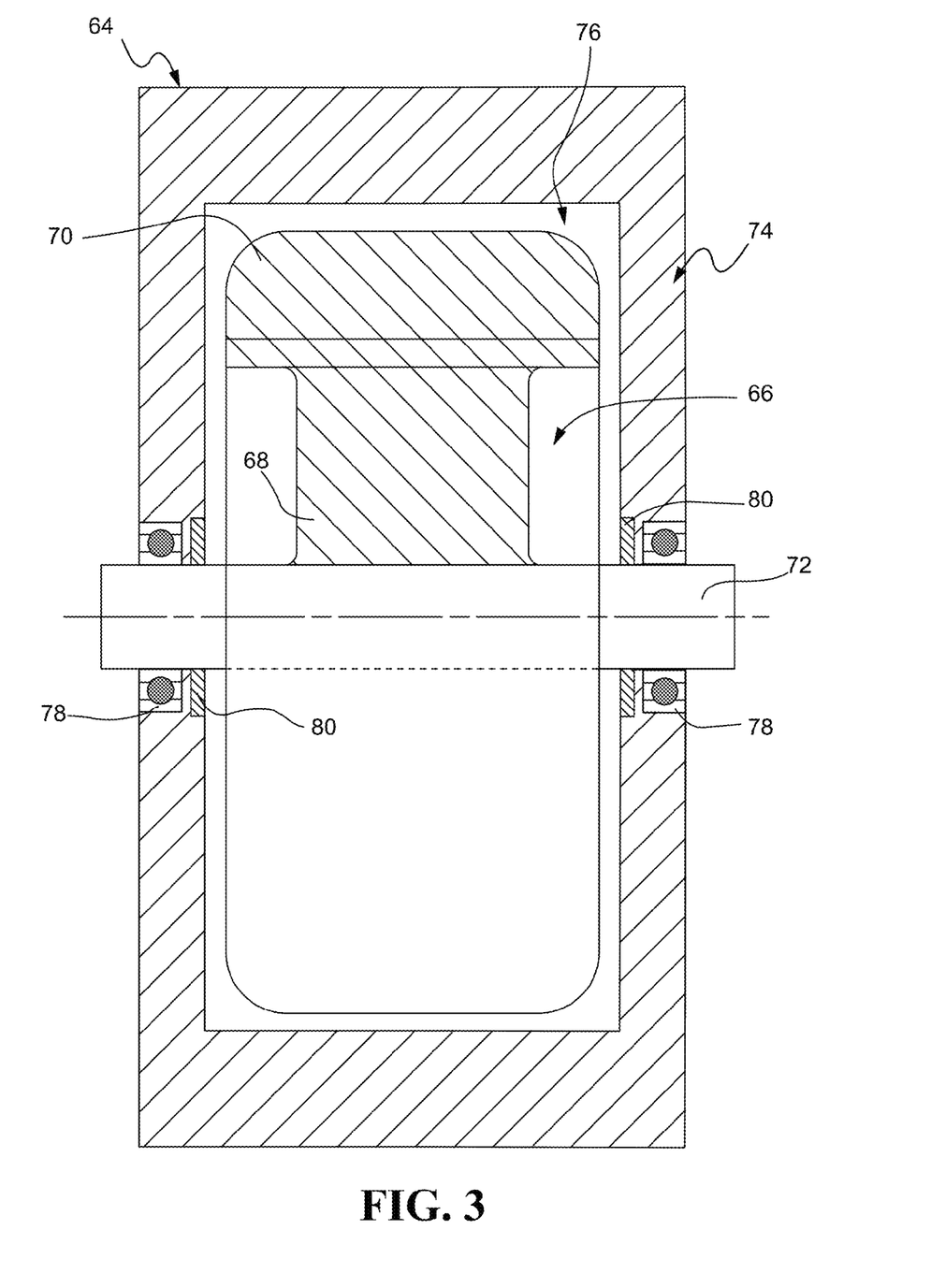
FIG. 3 is an enlarged schematic illustration of a flywheel used in the flywheel assembly of FIG. 2.

A flywheel assembly 62 may be coupled to the turbocharger 54 and selectively operated to add energy to, or remove energy from, the turbocharger 54. The flywheel assembly 62 may include a flywheel 64. As best shown in FIG. 3, the flywheel 64 may include a flywheel body 66 that includes a hub 68 and a rim 70. The hub 68 may be formed of a material, such as aluminum or steel, which is suitable for supporting the mass of the rim 70 when the flywheel body 66 rotates at speeds of up to 60,000 rpm or more. The rim 70 may be formed of any suitable flywheel material, such as iron, steel, or carbon fiber. A flywheel shaft 72 is coupled to the hub 68 and supported for rotation by a flywheel housing 74.

The flywheel housing 74 defines a chamber 76 sized to receive the flywheel body 66 and at least a portion of the flywheel shaft 72. Bearings 78 may be coupled to opposite sides of the flywheel housing 74 to journally support respective portions of the flywheel shaft 72. Two shaft seals 80 may be disposed between opposite sides of the flywheel housing 74 and the flywheel shaft 72 to provide air tight seals. A vacuum pump (not shown) may fluidly communicate with the chamber 76 to generate a partial vacuum inside the flywheel housing 74. The flywheel 64 may further include a cooling system (not shown) to maintain the flywheel chamber 76 at a desirable operating temperature.

Returning to FIG. 2, the flywheel assembly 62 also may include a flywheel clutch 82 for selectively engaging the flywheel 64 to the turbocharger 54. In the exemplary embodiment, one side of the flywheel clutch 82 is coupled to the turbocharger shaft 56, while the other side of the flywheel clutch is coupled, via a gearbox 84, to the flywheel shaft 72. The gearbox 84 may be configured to accommodate difference in operating speeds of the turbocharger 54 and the flywheel 64. For example, if the turbocharger 54 has a maximum operating speed of approximately 120,000 rpm and the flywheel has a maximum operating speed of approximately 60,000 rpm, the gearbox may have a gear ratio of approximately 2:1 to accommodate the difference in operating speeds. Other gear ratios, including gear ratios that accommodate a flywheel speed that is greater than a turbocharger speed, may also be used.

The flywheel assembly 62 further may include an electric motor/generator 86 configured to provide energy to or draw energy from the flywheel 64. In the illustrated embodiment, the electric motor/generator 86 includes a motor/generator shaft 88. A motor/generator clutch 90 may be provided to selectively couple the motor/generator shaft 88 to the flywheel shaft 72 (which may be via the gearbox 84 as shown).

A controller 92 may be provided to control operation of the flywheel assembly and/or other engine components based on user input and/or feedback regarding operating parameters. For example, the controller may be a dedicated flywheel assembly controller configured to actuate the flywheel clutch 82 and the motor/generator clutch 90. Alternatively, the controller 92 may be an electronic control module provided with the engine 24 and configured to operate other engine components in addition to the flywheel clutch 82 and optional motor/generator clutch 90. The controller 92 may include any components that may be used to run an application such as, for example, a memory, a secondary storage device, and a central processing unit. The controller 92 may, however, contain additional or different components such as, for example, mechanical or hydromechanical devices. Various other known circuits may be associated with the controller 92 such as, for example, power supply circuitry, signal-conditioning circuitry, solenoid driver circuitry, and other appropriate circuitry. While the controller 92 is depicted in the drawings as a single controller, connected, multiple controllers may be used.

The flywheel assembly 62 may include one or more feedback sensors for monitoring an operating parameter of the flywheel 64, the turbocharger 54, and/or additional engine components and providing a feedback signal to the controller 92. In the illustrated embodiment, a flywheel sensor 94 is provided to determine a flywheel operating parameter associated with the flywheel 64 and supply a flywheel feedback signal indicative of the flywheel operating parameter. For example, the flywheel sensor 94 may be a flywheel speed sensor configured to determine a rotational speed of the flywheel body 66 and generate a flywheel speed signal. Additionally or alternatively, the flywheel sensor 94 may comprise a flywheel temperature sensor configured to determine a temperature inside the flywheel housing 74 and generate a flywheel temperature signal. Stiller further, the flywheel sensor 94 may be configured to determine a pressure inside the flywheel housing 74 and generate a flywheel housing pressure signal.

The flywheel assembly 62 may also include a turbocharger sensor 96 configured to determine a turbocharger operating parameter associated with the turbocharger 54 and generate a turbocharger feedback signal indicative of the turbocharger operating parameter. For example, the turbocharger sensor 96 may be configured to determine a rotational speed of the turbine 52, compressor 42, and/or turbocharger shaft 56 and generate a turbocharger speed signal.

The engine 24 may include additional feedback sensors (not shown) associated with other components of the machine 20. Other feedback sensors may include an engine speed sensor, a drivetrain speed sensor, and other sensors that provide a signal indicative of an operating parameter of the machine. The other feedback sensors may be used to control operation of the engine 24, and may also be used to determine desired operating conditions for the turbocharger 54 and/or flywheel 64.

INDUSTRIAL APPLICABILITY

The foregoing flywheel assembly may be advantageously employed on machines having turbochargers to more quickly obtain the desired turbocharger speed. The flywheel shaft 72 may be selectively coupled to the turbocharger shaft 56 using the flywheel clutch 82, thereby to add energy to or remove energy from the turbocharger 54. The flywheel 64 may have a flywheel housing 74 that is separate and spaced from the turbocharger housing 58, thereby removing the flywheel 64 from the elevated temperature area of the turbocharger 54. As a result, the flywheel housing 74 may be maintained at a temperature that permits the use of materials for the flywheel body 66 that are temperature sensitive, such as carbon fiber. These materials may have improved strength-to-weight ratios that permit rotation at higher speeds, thereby increasing the energy storage capacity of the flywheel 64. Additionally, the use of a separate flywheel housing 74 allows the flywheel body 66 to be sized as needed, without size limits that may be imposed when the flywheel 64 is incorporated into other structures, such as the turbocharger housing 58. Still further, the optional electric motor/generator 86 may be selectively coupled to the flywheel shaft 72 to draw energy from the flywheel 64 to power auxiliary systems provided on the machine and/or to supply energy to the flywheel 64 to assist with initial "spin up" of the flywheel body during start-up of the machine.

More specifically, the controller 92 may be configured to operate the flywheel clutch 82 in response to feedback from the flywheel sensor 94 and the turbocharger sensor 96. In an exemplary embodiment, the flywheel sensor 94 may determine a rotational speed of the flywheel 64 and generate a flywheel speed signal indicative of the flywheel speed, while the turbocharger sensor 96 may determine a rotational speed of the turbocharger and generate a turbocharger speed signal indicative of the turbocharger speed. The controller 92 may be configured to operate the flywheel clutch 82 based on the flywheel speed signal and the turbocharger speed signal.

For example, the controller 92 may be configured to determine, based on user input or sensed operating parameters, a threshold turbocharger speed and a threshold flywheel speed. The controller 92 may further be configured to command the flywheel clutch 82 to an engaged position when the turbocharger speed signal indicates a turbocharger speed greater than the threshold turbocharger speed and the flywheel speed signal indicates a flywheel speed less than the threshold flywheel speed. Such a condition may exist, for example, when the total power load on the engine 24 decreases, such as when auxiliary systems are turned off or the torque load from the ground engaging members 26 decreases. As a result, the operating speed of the turbocharger 54 may exceed a required turbocharger speed for the power load, which may lead to inefficient engine operation. The flywheel 64, therefore, may be engaged to draw energy from the turbocharger 54, thereby to more quickly decelerate the turbocharger 54 to the desired speed.

Additionally or alternatively, the controller 92 may be configured to command the flywheel clutch 82 to the engaged position when the turbocharger speed signal indicates a turbocharger speed less than the threshold turbocharger speed and the flywheel speed signal indicates a flywheel speed greater than the threshold flywheel speed. Such a condition may exist, for example, when the total power load on the engine 24 increases, such as when auxiliary systems are turned on or the torque load from the ground engaging member 26 increases. When the flywheel clutch 82 is engaged under these conditions, the turbocharger 54 will draw energy from the flywheel 64, thereby to more quickly accelerate the turbocharger 54 to the desired speed and increase engine efficiency.

The controller 92 may further be configured to actuate the motor/generator clutch 90 in response to feedback from the sensors. When both the flywheel and turbocharger speeds exceed associated thresholds, the flywheel assembly 62 may have a surplus of energy. The motor/generator clutch 90 may be engaged in these conditions to supply energy to other systems operably coupled to the electric motor/generator 86. Alternatively, energy stored in the electric motor/generator 86 may be supplied to the flywheel 64 during start-up of the machine 20, to more quickly accelerate the flywheel 64 to the desired operating speed.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of operating a turbocharger disposed in a turbocharger housing, comprising:
    directing exhaust flow from an engine through a turbine, thereby to rotate the turbine;
    mechanically coupling a compressor to the turbine so that the compressor rotates with the turbine and forms the turbocharger, the compressor being disposed in an air intake and configured to receive air from atmosphere and provide compressed air to the engine;
    providing a rotatable flywheel in a flywheel housing that is separate and spaced from the turbocharger housing;
    determining an actual turbocharger speed;
    determining an actual flywheel speed; and
    selectively mechanically coupling the flywheel to the turbocharger based on the actual turbocharger speed and the actual flywheel speed based on:
        a first mode of operation in which the actual flywheel speed is below a first flywheel speed threshold and the actual turbocharger speed is above a first turbocharger speed threshold, thereby to supply energy from the turbine to the flywheel;
        a second mode of operation in which the actual flywheel speed is above a second flywheel speed threshold and the actual turbocharger speed is below a second turbocharger speed threshold, thereby to supply energy from the flywheel to the turbine.

2. The method of claim 1, further comprising:
    providing an electric motor/generator operably coupled to the flywheel and a motor/generator clutch operably coupled between the electric motor/generator and the flywheel;
    determining an actual motor/generator speed; and
    selectively mechanically coupling the flywheel to the motor/generator based on the actual motor/generator speed and the actual flywheel speed.

3. The method of claim 2, in which selectively mechanically coupling the flywheel to the motor/generator is based on:
    a third mode of operation in which the flywheel is disengaged from the turbocharger and engaged to the turbine/generator when the actual flywheel speed is below a third flywheel speed threshold and the actual motor/generator speed is above a first motor/generator speed threshold, thereby to supply energy from the motor/generator to the flywheel; and
    a fourth mode of operation in which the flywheel is disengaged from the turbocharger and engaged to the turbine/generator when the actual flywheel speed is above a fourth flywheel speed threshold and the actual motor/generator speed is below a second motor/generator speed threshold, thereby to supply energy from the flywheel to the motor/generator.

4. A flywheel assembly for a turbocharger having a turbocharger housing, a turbine disposed in the turbocharger housing, a compressor disposed in the turbocharger housing, and a turbocharger shaft interconnecting the turbine and the compressor in a rotationally fixed manner, the flywheel assembly comprising:
    a flywheel housing separate and spaced from the turbocharger housing;
    a flywheel shaft rotatably supported by the flywheel housing and separate from the turbocharger shaft;
    a flywheel body coupled to the flywheel shaft and disposed in the flywheel housing;
    a flywheel sensor configured to determine a flywheel operating parameter and supply a flywheel feedback signal indicative of the flywheel operating parameter;
    a turbocharger sensor configured to determine a turbocharger operating parameter and supply a turbocharger feedback signal indicative of the turbocharger operating parameter;
    a flywheel clutch configured to selectively couple the flywheel shaft to the turbocharger shaft; and
    a controller operably coupled to the flywheel clutch, the turbocharger sensor, and the flywheel sensor and configured to operate the flywheel clutch based on the flywheel feedback signal and the turbocharger feedback signal, the controller further being configured to:
        operate in a first mode to engage the flywheel clutch when the flywheel feedback signal is below a first flywheel feedback threshold and the turbocharger feedback signal is above a first turbocharger feedback threshold, thereby to supply energy from the turbocharger shaft to the flywheel shaft; and
        operate in a second mode to engage the flywheel clutch when the flywheel feedback signal is above a second flywheel feedback threshold and the turbocharger feedback signal is below a second turbocharger feedback threshold, thereby to supply energy from the flywheel shaft to the turbocharger shaft.

5. The flywheel assembly of claim 4, in which the flywheel sensor comprises a flywheel speed sensor and the flywheel operating parameter comprises a flywheel speed.

6. The flywheel assembly of claim 4, in which:
the flywheel sensor comprises a flywheel speed sensor and the flywheel feedback signal comprises a flywheel speed signal indicative of a flywheel speed;
the turbocharger sensor comprises a turbocharger speed sensor and the turbocharger feedback signal comprises a turbocharger speed signal indicative of a turbocharger speed; and
the controller is configured to operate the flywheel clutch in the first and second modes based on the flywheel speed signal and the turbocharger speed signal.

7. The flywheel assembly of claim 6, in which the controller is configured to:
determine a threshold turbocharger speed;
determine a threshold flywheel speed; and
operate in the first mode when the turbocharger speed signal indicates a turbocharger speed greater than the threshold turbocharger speed and the flywheel speed signal indicates a flywheel speed less than the threshold flywheel speed.

8. The flywheel assembly of claim 6, in which the controller is configured to:
determine a threshold turbocharger speed;
determine a threshold flywheel speed; and
operate in the second mode when the turbocharger speed signal indicates a turbocharger speed less than the threshold turbocharger speed and the flywheel speed signal indicates a flywheel speed greater than the threshold flywheel speed.

9. The flywheel assembly of claim 4, further comprising a gearbox operably coupled between the flywheel clutch and the flywheel shaft.

10. The flywheel assembly of claim 4, further comprising an electric motor/generator operably coupled to the flywheel shaft.

11. The flywheel assembly of claim 10, further comprising a motor/generator clutch operably coupled between the electric motor/generator and the flywheel shaft and a motor/generator sensor configured to determine a motor/generator operating parameter and supply a motor/generator feedback signal indicative of the motor/generator operating parameter, wherein the controller is further operably coupled to the motor/generator clutch.

12. The flywheel assembly of claim 11, in which the controller is further configured to:
operate in a third mode to disengage the flywheel clutch and engage the motor/generator clutch when the flywheel feedback signal is below a third flywheel feedback threshold and the motor/generator feedback signal is above a first motor/generator feedback threshold, thereby to supply energy from the motor/generator to the flywheel shaft; and
operate in a fourth mode to disengage the flywheel clutch and engage the motor/generator clutch when the flywheel feedback signal is above a fourth flywheel feedback threshold and the motor/generator feedback signal is below a second motor/generator feedback threshold, thereby to supply energy from the flywheel shaft to the motor/generator.

13. A machine comprising:
an internal combustion engine including a plurality of cylinders, each cylinder having at least one inlet opening and at least one exhaust gas opening;
an intake manifold fluidly communicating with each inlet opening;
an exhaust manifold fluidly communicating with each exhaust gas opening;
a turbocharger including:
a turbocharger housing;
a turbine disposed in the turbocharger housing and having a turbine inlet fluidly communicating with the exhaust manifold and a turbine outlet fluidly communicating with atmosphere;
a compressor disposed in the turbocharger housing having a compressor inlet fluidly communicating to atmosphere and a compressor outlet fluidly communicating with the intake manifold;
a turbocharger shaft interconnecting the turbine and the compressor in a rotationally fixed manner; and
a turbocharger sensor configured to determine a turbocharger operating parameter and supply a turbocharger feedback signal indicative of the turbocharger operating parameter;
a flywheel assembly including:
a flywheel housing separate and spaced from the turbocharger housing;
a flywheel shaft rotatably supported by the flywheel housing and separate from the turbocharger shaft;
a flywheel body coupled to the flywheel shaft and disposed in the flywheel housing;
a flywheel sensor configured to determine a flywheel operating parameter and supply a flywheel feedback signal indicative of the flywheel operating parameter; and
a flywheel clutch configured to selectively couple the flywheel shaft to the turbocharger shaft; and
a controller operably coupled to the flywheel clutch, the flywheel sensor, and the turbocharger sensor, the controller configured to operate the flywheel clutch based on the flywheel feedback signal and the turbocharger feedback signal, the controller further being configured to:
operate in a first mode to engage the flywheel clutch when the flywheel feedback signal is below a first flywheel feedback threshold and the turbocharger feedback signal is above a first turbocharger feedback threshold, thereby to supply energy from the turbocharger shaft to the flywheel shaft; and
operate in a second mode to engage the flywheel clutch when the flywheel feedback signal is above a second flywheel feedback threshold and the turbocharger feedback signal is below a second turbocharger feedback threshold, thereby to supply energy from the flywheel shaft to the turbocharger shaft.

14. The machine of claim 13, in which:
the flywheel sensor comprises a flywheel speed sensor and the flywheel feedback signal comprises a flywheel speed signal indicative of a flywheel speed;
the turbocharger sensor comprises a turbocharger speed sensor and the turbocharger feedback signal comprises a turbocharger speed signal indicative of a turbocharger speed; and
the controller is configured to operate the flywheel clutch in the first and second modes based on the flywheel speed signal and the turbocharger speed signal.

15. The machine of claim 14, in which the controller is configured to:
determine a threshold turbocharger speed;
determine a threshold flywheel speed; and
operate in the first mode when the turbocharger speed signal indicates a turbocharger speed greater than the threshold turbocharger speed and the flywheel speed signal indicates a flywheel speed less than the threshold flywheel speed.

16. The machine of claim 14, in which the controller is configured to:
  determine a threshold turbocharger speed;
  determine a threshold flywheel speed; and
  operate in the second mode when the turbocharger speed signal indicates a turbocharger speed less than the threshold turbocharger speed and the flywheel speed signal indicates a flywheel speed greater than the threshold flywheel speed.

17. The machine of claim 13, further comprising a gearbox operably coupled between the flywheel clutch and the flywheel shaft.

18. The machine of claim 13, further comprising an electric motor/generator operably coupled to the flywheel shaft.

19. The machine of claim 18, further comprising a motor/generator clutch operably coupled between the electric motor/generator and the flywheel shaft and a motor/generator sensor configured to determine a motor/generator operating parameter and supply a motor/generator feedback signal indicative of the motor/generator operating parameter, wherein the controller is further operably coupled to the motor/generator clutch.

20. The machine of claim 19, in which the controller is further configured to:
  operate in a third mode to disengage the flywheel clutch and engage the motor/generator clutch when the flywheel feedback signal is below a third flywheel feedback threshold and the motor/generator feedback signal is above a first motor/generator feedback threshold, thereby to supply energy from the motor/generator to the flywheel shaft; and
  operate in a fourth mode to disengage the flywheel clutch and engage the motor/generator clutch when the flywheel feedback signal is above a fourth flywheel feedback threshold and the motor/generator feedback signal is below a second motor/generator feedback threshold, thereby to supply energy from the flywheel shaft to the motor/generator.

* * * * *